United States Patent
Tanimoto et al.

(10) Patent No.: US 8,791,716 B2
(45) Date of Patent: Jul. 29, 2014

(54) ANOMALY DETECTOR OF PERMANENT MAGNET SYNCHRONOUS ELECTRIC MOTOR

(75) Inventors: Tsutomu Tanimoto, Kawasaki (JP); Tomoya Imazu, Yokohama (JP); Yoshinori Nakano, Yokohama (JP)

(73) Assignees: Nissan Motor Co., Ltd., Yokohama-shi (JP); Meidensha Corporation, Tokyo (JP)

( * ) Notice: Subject to any disclaimer, the term of this patent is extended or adjusted under 35 U.S.C. 154(b) by 242 days.

(21) Appl. No.: 13/391,860

(22) PCT Filed: Aug. 27, 2010

(86) PCT No.: PCT/JP2010/064554
§ 371 (c)(1), (2), (4) Date: Feb. 23, 2012

(87) PCT Pub. No.: WO2011/024935
PCT Pub. Date: Mar. 3, 2011

(65) Prior Publication Data
US 2012/0146683 A1    Jun. 14, 2012

(30) Foreign Application Priority Data
Aug. 28, 2009 (JP) ................. 2009-198041

(51) Int. Cl.
*G01R 31/34* (2006.01)

(52) U.S. Cl.
USPC ............... 324/765.01; 318/700; 318/708

(58) Field of Classification Search
CPC ... H02P 29/0066; H02P 29/0044; G01K 7/36; G01R 31/34
USPC .................................. 324/765.01
See application file for complete search history.

(56) References Cited

U.S. PATENT DOCUMENTS 7,099,793 B2 * 8/2006 Rechberger ............ 702/130
7,392,158 B2 * 6/2008 Hikawa et al. ......... 702/185
(Continued)

FOREIGN PATENT DOCUMENTS

| CN | 100436823 C | 11/2008 |
| CN | 101325395 A | 12/2008 |
| JP | 2001186800 | * 7/2001 |
| JP | 2002-95300 A | 3/2002 |

(Continued)

OTHER PUBLICATIONS

Qian Hao et al., Vector Control System of PM SM Based on DSP, Mechanical & Electrical Engineering Magazine, vol. 23, No. 5, 2006, pp. 12-15.

(Continued)

*Primary Examiner* — Arleen M Vazquez
*Assistant Examiner* — Feba Pothen
(74) *Attorney, Agent, or Firm* — Foley & Lardner LLP

(57) ABSTRACT

Under a condition that rotor rotation speeds ωes are equal, winding wire currents Id, Iq are equal, and winding wire inductances Ld, Lq are equal in first and second electric motors (1, 2), a magnet temperature anomaly detector (30) provided in a microcomputer (5) calculates a change ratio $d(|\Phi ml-\Phi mr|)/dt$ of a magnetic flux difference between the first and second electric motors (1, 2) based on the difference $Vql^*-Vqr^*$ between a q-axis voltage command value $Vql^*$ corresponding to the first electric motor (1) and a q-axis voltage command value Vqr corresponding to the second electric motor (2), and then when the change ratio $d(|\Phi ml-\Phi mr|)/dt$ of the magnetic flux difference is more than a predetermined threshold Sh1, it is determined that a permanent magnet of at least any one of the electric motors (1, 2) has a temperature anomaly.

15 Claims, 5 Drawing Sheets

(56) References Cited

U.S. PATENT DOCUMENTS

| | | |
|---|---|---|
| 7,595,600 B2 | 9/2009 | Patel et al. |
| 8,222,844 B2 * | 7/2012 | Eisenhardt ............... 318/400.01 |
| 2005/0247073 A1 | 11/2005 | Hikawa et al. |
| 2008/0303475 A1 | 12/2008 | Patel et al. |
| 2009/0174351 A1 | 7/2009 | Eisenhardt |
| 2010/0276929 A1 * | 11/2010 | Jansen ............................ 290/44 |

FOREIGN PATENT DOCUMENTS

| | | |
|---|---|---|
| JP | 2004-72931 A | 3/2004 |
| JP | 2006-14554 A | 1/2006 |
| JP | 2007-274779 A | 10/2007 |

OTHER PUBLICATIONS

Chinese Office Action, Mar. 26, 2014, 9 pages.

\* cited by examiner

ANOMALY DETECTOR OF PERMANENT
MAGNET SYNCHRONOUS ELECTRIC
MOTOR

TECHNICAL FIELD

The present invention relates to an anomaly detector for detecting an anomaly of a magnet temperature of a permanent magnet synchronous electric motor used as an electric motor for an electric vehicle.

BACKGROUND ART

As an electric motor for an electric vehicle such as electric car and hybrid car, a permanent magnet synchronous electric motor which has a high torque density and can be relatively easily made compact and can cause a high output is used in many situations. The permanent magnet synchronous electric motor used as an electric motor for the electric vehicle has such a tendency as to increase heat density due to compact size with the output maintained to thereby increase temperature. When the temperature of the permanent magnet is more than or equal to a predetermined temperature, the permanent magnet synchronous electric motor causes an irreversible demagnetization to thereby significantly decrease the output, therefore, for preventing such output decrease, monitoring of the temperature of the permanent magnet is needed. However, since the permanent magnet is disposed on the rotor side, directly measuring the permanent magnet by means of a temperature sensor is of difficulty. Thus, a method of estimating the temperature of the permanent magnet from other information is being considered.

As one of such estimating methods, for example, Patent Literature 1 describes a technology which makes a map of a relation between the winding wire temperature and the magnet temperature and estimates the magnet temperature by referring to a detection value of a winding wire temperature sensor.

CITATION LIST

Patent Literature

Patent Literature 1: Japanese Patent Unexamined Publication No. 2002-95300

SUMMARY OF INVENTION

Estimating the magnet temperature of the permanent magnet synchronous electric motor with a high accuracy by the technology described in the Patent Literature 1 needs such a condition that the temperature of the winding wire disposed on the stator side constantly corresponds to the temperature of the permanent magnet disposed on the rotor side on one-on-one level. Herein, the main cause for the increase in temperature of the winding wire includes a copper loss attributable to the winding wire current. On the other hand, the main cause for the increase in temperature of the permanent magnet includes the rotor's iron loss attributable to the magnetic flux density measurement and frequency in the rotor. At a constant rotor rotation speed and under a constant torque command value, the relation between the copper loss and the rotor's iron loss can be secured on one-on-one level to a certain extent, however, the relation between the copper loss and the rotor's iron loss changes from moment to moment in an application as an electric motor for an electric vehicle where the rotor rotation speed and the torque command value constantly change. Consequently, in the permanent magnet synchronous electric motor used as an electric motor for an electric vehicle, estimating the magnet temperature by the technology described in the Patent Literature 1 is of difficulty, making it difficult to accurately detect the anomaly of the magnet temperature, which was a problem.

In view of the above problem of the conventional technology, the present invention has been made, and it is an object of the present invention to provide an anomaly detector capable of detecting, with a high accuracy, an anomaly of a magnet temperature of a permanent magnet synchronous electric motor used as an electric motor for an electric vehicle.

According to a first aspect of the present invention, there is provided an anomaly detector of a permanent magnet synchronous electric motor, including: a plurality of permanent magnet synchronous electric motors; a current command value calculator for calculating current command values relative to the plurality of the permanent magnet synchronous electric motors; q-axis voltage command value calculators for calculating each of q-axis voltage command values relative to the plurality of the permanent magnet synchronous electric motors based on the current command values each calculated by the current command value calculator; and a magnet temperature anomaly determiner for determining whether or not an anomaly of a magnet temperature is caused to at least any one of the permanent magnet synchronous electric motors, the determining operation being implemented by using a difference between: a q-axis voltage command value which is calculated by one of the q-axis voltage command value calculators and is relative to one permanent magnet synchronous electric motor of the plurality of the permanent magnet synchronous electric motors, and a q-axis voltage command value which is calculated by another of the q-axis voltage command value calculators and is relative to another permanent magnet synchronous electric motor of the plurality of the permanent magnet synchronous electric motors.

According to a second aspect of the present invention, there is provided a method of detecting an anomaly of a permanent magnet synchronous electric motor, including: calculating current command values relative to a plurality of permanent magnet synchronous electric motors; calculating each of q-axis voltage command values relative to the plurality of the permanent magnet synchronous electric motors based on the current command values each calculated by the current command value calculating operation; and determining whether or not an anomaly of a magnet temperature is caused to at least any one of the permanent magnet synchronous electric motors, the determining operation being implemented by using a difference between: a q-axis voltage command value which is calculated by one of the q-axis voltage command value calculating operations and is relative to one permanent magnet synchronous electric motor of the plurality of the permanent magnet synchronous electric motors, and a q-axis voltage command value which is calculated by another of the q-axis voltage command value calculating operations and is relative to another permanent magnet synchronous electric motor of the plurality of the permanent magnet synchronous electric motors.

According to a third aspect of the present invention, there is provided an anomaly detecting means of a permanent magnet synchronous electric motoring means, including: a plurality of permanent magnet synchronous electric motoring means; a current command value calculating means for calculating current command values relative to the plurality of the permanent magnet synchronous electric motoring means; q-axis voltage command value calculating means for calculating each of q-axis voltage command values relative to the plurality of the permanent magnet synchronous electric motoring means based on the current command values each calculated by the current command value calculating means; and a magnet temperature anomaly determining means for determining whether or not an anomaly of a magnet temperature is caused to at least any one of the permanent magnet synchronous electric motoring means, the determining operation being implemented by using a difference between: a q-axis voltage command value which is calculated by one of the q-axis voltage command value calculating means and is relative to one permanent magnet synchronous electric motoring means of the plurality of the permanent magnet synchronous electric motoring means, and a q-axis voltage command value which is calculated by another of the q-axis voltage command value calculating means and is relative to another permanent magnet synchronous electric motoring means of the plurality of the permanent magnet synchronous electric motoring means.

According to the present invention, the difference of the q-axis voltage command values relative to permanent magnet synchronous motors is used for determining whether or not an anomaly of the magnet temperature is caused to at least any one of the permanent magnet synchronous motors. Thus, without the need of directly measuring the temperature of the permanent magnet of each of the permanent magnet synchronous motors by means of a temperature sensor and the like, the anomaly of the magnet temperature of the permanent magnet synchronous motors each used as an electric motor for an electric vehicle can be accurately detected.

DESCRIPTION OF EMBODIMENTS

Hereinafter, specific embodiments of the present invention will be set forth in detail referring to drawings.
(First Embodiment)

Figure 1:
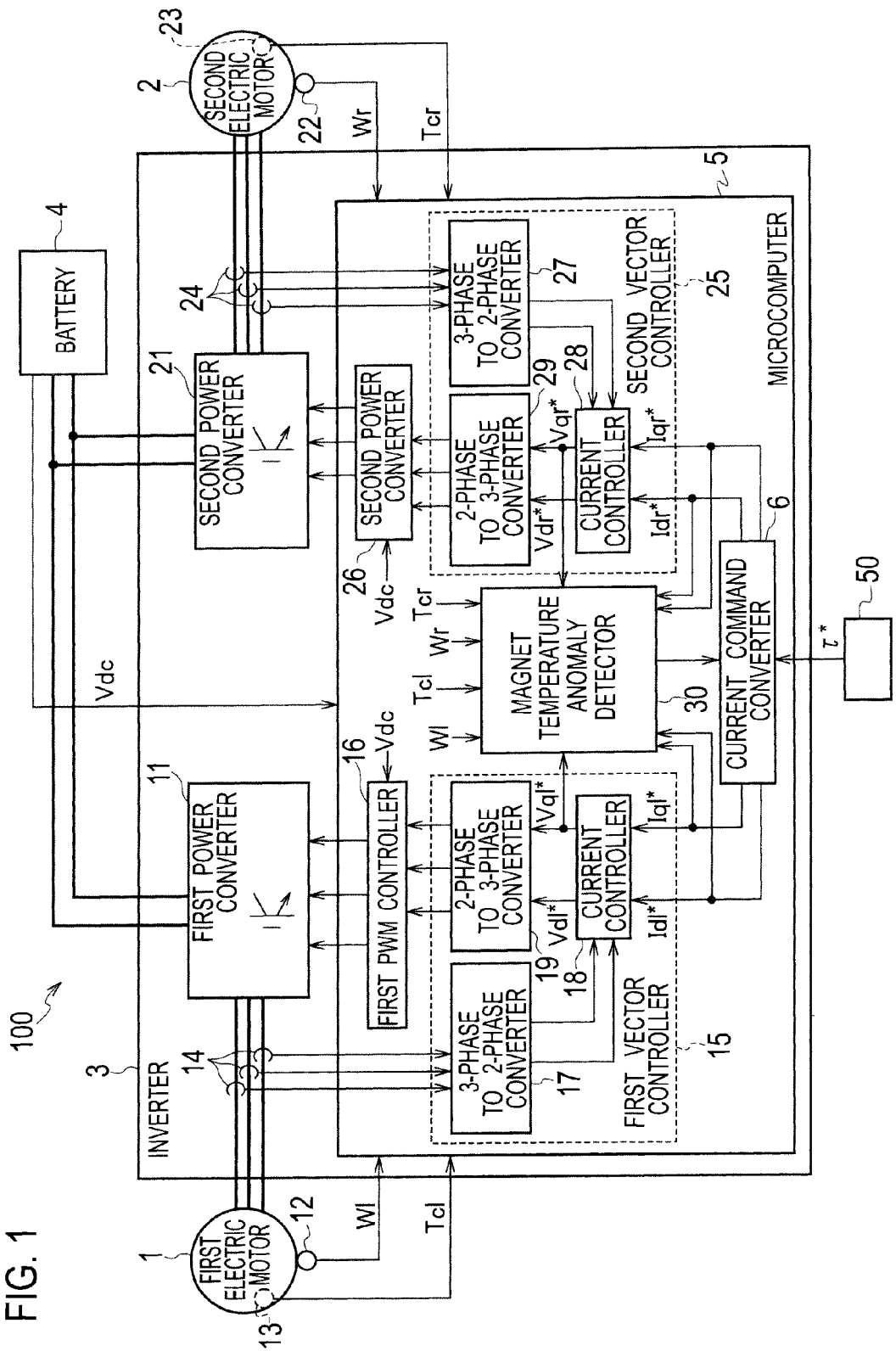
FIG. 1 is a schematic structure showing a driving control system of an electric vehicle to which the present invention is applied.

FIG. 1 is a schematic structure showing a driving control system 100 of an electric vehicle to which the present invention is applied. The driving control system 100 includes two permanent magnet synchronous electric motors 1, 2 for independently driving left and right wheels of the electric vehicle, an inverter 3 for driveably controlling the two permanent magnet synchronous electric motors 1, 2, and a battery 4 serving as an electric power supply.

A direct current power from the battery 4 is converted into an alternating current power by a first power converter 11 of the inverter 3 and then the alternating current power is supplied to the first electric motor 1 (of the two permanent magnet synchronous electric motors 1, 2) which rotates the left driving wheel of the electric vehicle. When ON/OFF operations of a switching element such as IGBT are PWM-controlled, the first power converter 11 converts the direct current power from the battery 4 into a desired alternating current power and supplies the thus converted alternating current power to the first electric motor 1. The first electric motor 1 causes a desired torque by the alternating current power from the first power converter 11, to thereby rotate the left driving wheel of the electric vehicle. A rotor rotation speed Wl of the first electric motor 1 is detected by a speed sensor 12. Moreover, a winding wire temperature Tcl of the first electric motor 1 is detected by a temperature sensor 13 set at a winding wire. Detection value of the speed sensor 12 (rotor rotation speed Wl) and detection value of the temperature sensor 13 (winding wire temperature Tcl) are each inputted to a microcomputer 5 incorporated in the inverter 3.

On the other hand, a direct current power from the battery 4 is converted into an alternating current power by a second power converter 21 of the inverter 3 and then the alternating current power is supplied to the second electric motor 2 which rotates the right driving wheel of the electric vehicle. When ON/OFF operations of a switching element such as IGBT are PWM-controlled, the second power converter 21 converts the direct current power from the battery 4 into a desired alternating current power and supplies the thus converted alternating current power to the second electric motor 2. The second electric motor 2 causes a desired torque by the alternating current power from the second power converter 21, to thereby rotate the right driving wheel of the electric vehicle. A rotor rotation speed Wr of the second electric motor 2 is detected by a speed sensor 22. Moreover, a winding wire temperature Tcr of the second electric motor 2 is detected by a temperature sensor 23 set at a winding wire. Detection value of the speed sensor 22 (rotor rotation speed Wr) and detection value of the temperature sensor 23 (winding wire temperature Tcr) are each inputted to the microcomputer 5 incorporated in the inverter 3.

The current supplied from the first power converter 11 to the first electric motor 1 is detected by a current sensor 14 while the current supplied from the second power converter 21 to the second electric motor 2 is detected by a current sensor 24. Detection values of the current sensors 14, 24 are also inputted to the microcomputer 5. Moreover, a direct current voltage Vdc of the battery 4 is inputted to the microcomputer 5.

The microcomputer 5 is a controller for implementing the PWM control of the first power converter 11 and second power converter 21 of the inverter 3. The microcomputer 5 has a current command converter 6, a first vector controller 15 and a first PWM controller 16 which correspond to the first electric motor 1 and a second vector controller 25 and a second PWM controller 26 which correspond to the second electric motor 2.

The current command converter 6 converts a torque command value τ* from the vehicle controller 50 into d-axis current command values Idl*, Idr* and q-axis current command values Iql*, Iqr*. The current command values Idl*, Iql* generated by the current command converter 6 are inputted to the first vector controller 15 while the current command values Idr*, Iqr* generated by the current command converter 6 are inputted to the second vector controller 25.

The first vector controller 15 converts the detection value of the current sensor 14 from 3-phase to 2-phase at a 3-phase to 2-phase converter 17. Then, based on the current detection value converted to 2-phase and on the current command values Idl*, Iql* from the current command converter 6, a current controller 18 calculates a d-axis voltage command value Vdl* and a q-axis voltage command value Vql*. Then, the voltage command values Vdl*, Vql* are converted (from 2-phase to 3-phase) by a 2-phase to 3-phase converter 19 and then are outputted to the first PWM controller 16.

Based on the 3-phase voltage command value from the first vector controller 15 and on the direct current voltage Vdc of the battery 4, the first PWM controller 16 generates a PWM waveform for driving the switching element of the first power converter 11 and then supplies the PWM waveform to the first power converter 11. By this operation, the first power converter 11 is subjected to the PWM control, to thereby allow the first electric motor 1 to cause a torque which accords to a torque command value τ*.

Like the first vector controller 15, the second vector controller 25 converts the detection value of the current sensor 24 from 3-phase to 2-phase at a 3-phase to 2-phase converter 27. Then, based on the current detection value converted to 2-phase and on the current command current command values Idr*. Iqr* from the current command converter 6, a current controller 28 calculates a d-axis voltage command value Vdr* and a q-axis voltage command value Vqr*. Then, the voltage command values Vdr*, Vqr* are converted (from 2-phase to 3-phase) by a 2-phase to 3-phase converter 29 and then are outputted to the second PWM controller 26.

Like the first PWM controller 16, based on the 3-phase voltage command value from the second vector controller 25 and on the direct current voltage Vdc of the battery 4, the second PWM controller 26 generates a PWM waveform for driving the switching element of the second power converter 21 and then supplies the PWM waveform to the second power converter 21. By this operation, the second power converter 21 is subjected to the PWM control, to thereby allow the second electric motor 2 to cause a torque which accords to the torque command value τ*.

In the driving control system 100 of the electric vehicle according to the first embodiment, the microcomputer 5 incorporated in the inverter 3 has a function of a magnet temperature anomaly detector 30 for detecting the anomaly of the magnet temperature caused to at least one of the first electric motor 1 and the second electric motor 2, where the anomaly detection is done by using the q-axis voltage command value Vql* corresponding to the first electric motor 1 and the q-axis voltage command value Vqr* corresponding to the second electric motor 2. That is, according to the first embodiment, the anomaly detector of the present invention is realized as a function of the microcomputer 5. Hereinafter, anomaly detection processings by the magnet temperature anomaly detector 30 of the microcomputer 5 will be set forth more in detail.

A q-axis voltage Vql of the first electric motor 1 is given by the following expression (1).

$$Vql = \omega el \cdot Ldl \cdot Idl + Rl \cdot Iql + p \cdot Lql \cdot Iql + \omega el \cdot \Phi ml \quad (1)$$

where ωel denotes a rotor rotation speed (electric angle) of the first electric motor 1. Ldl denotes a d-axis inductance of the first electric motor 1, Idl denotes a d-axis current of the first electric motor 1, Rl denotes a winding wire resistance of the first electric motor 1, Lql denotes a q-axis inductance of the first electric motor 1, Iql denotes a q-axis current of the first electric motor 1, Φml denotes an interlinkage magnetic flux of the first electric motor 1, and p denotes a differential operator (p=d/dt).

Likewise, a q-axis voltage Vqr of the second electric motor 2 is given by the following expression (2) where suffixes in the above expression (1) are each changed from "l" to "r".

$$Vqr = \omega er \cdot Ldr \cdot Idr + Rr \cdot Iqr + p \cdot Lqr \cdot Iqr + \omega er \cdot \Phi mr \quad (2)$$

where ωel denotes a rotor rotation speed (electric angle) of the second electric motor 2, Ldr denotes a d-axis inductance of the second electric motor 2, Idr denotes a d-axis current of the second electric motor 2, Rr denotes a winding wire resistance of the second electric motor 2, Lqr denotes a q-axis inductance of the second electric motor 2, Iqr denotes a q-axis current of the second electric motor 2, Φmr denotes an interlinkage magnetic flux of the second electric motor 2, and p denotes a differential operator (p=d/dt).

Herein, under a condition that the corresponding rotor rotation speeds ωes (i.e., ωel and ωer) have the same value, the corresponding winding wire currents Id, Iq (i.e., Idl and Idr, Iql and Iqr) have the same value, and the corresponding winding wire inductances Ld, Lq (i.e., Ldl and Ldr, Lql and Lqr) have the same value in the electric motors 1, 2, taking a difference Vql–Vqr between the q-axis voltages Vql, Vqr of the respective electric motors 1, 2 gives the following expression (3) from the above expressions (1) and (2).

$$Vql - Vqr = (Rl - Rr)Iql + \omega el(\Phi ml - \Phi mr) \quad (3)$$

In the above expression (3), the winding wire resistances Rl, Rr change respectively depending on the winding wire temperatures of the electric motors 1, 2, while the winding wire temperature Tcl of the first electric motor 1 is detected by the temperature sensor 13 and the winding wire temperature Tcr of the second electric motor 2 is detected by the temperature sensor 23, therefore, it is possible to estimate the winding wire resistances Rr, Rl from the detection values (winding wire temperatures Tcl, Tcr) of the temperature sensors 13, 23. Moreover, the supply current to the first electric motor 1 is detected by the current sensor 14 and the rotor rotation speed Wl is detected by the speed sensor 12, therefore, the q-axis current Iql and the rotor rotation speed (electric angle) ωel can also be detected from the detection value of the current sensor 14 (supply current to the first motor 1) and the detection value of the speed sensor 12 (rotor rotation speed Wl). Thus, from the difference Vql–Vqr between the q-axis voltage Vql of the first electric motor 1 and the q-axis voltage Vqr of the second electric motor 2, Φml–Φmr of the second term of the right member of the expression (3), that is, the difference of the interlinkage magnetic fluxes of the electric motors 1, 2 can be calculated. In addition, the difference Vql–Vqr between the q-axis voltage Vql of the first electric motor 1 and the q-axis voltage Vqr of the second electric motor 2 may be given by taking the difference Vql*–Vqr*, that is, the q-axis voltage command value Vql* calculated by the current controller 18 of the first vector controller 15 and the q-axis voltage command value Vqr* calculated by the current controller 28 of the second vector controller 25.

Figure 2:
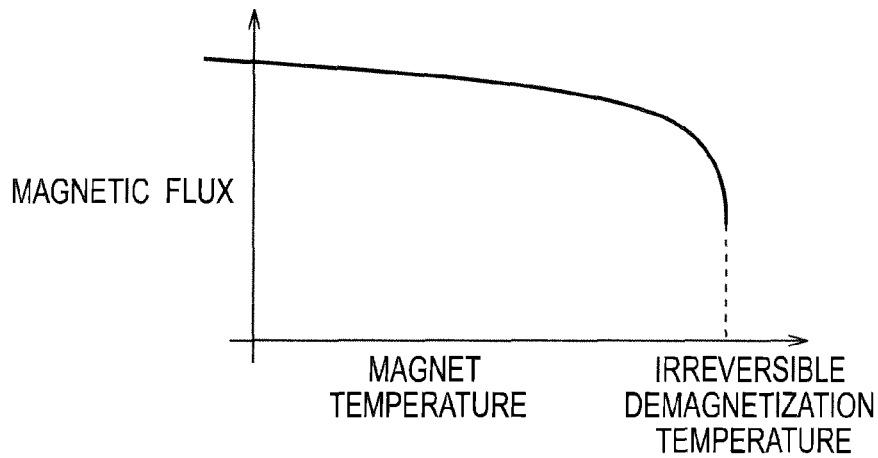
FIG. 2 is a graph showing a relation between the magnetic flux and magnet temperature of a permanent magnet included in an electric motor.

The interlinkage magnetic fluxes Φml, Φmr of the respective electric motors 1, 2 are in proportion to the magnetic fluxes of the permanent magnets included in the respective electric motors 1, 2. The magnetic flux of each of the electric motors 1, 2 has a tendency to decrease as the magnet temperature is higher, as shown in FIG. 2. The decrease of the magnetic flux relative to the temperature increase is nonlinear, where the higher the magnet temperature is the larger the decrease allowance is.

Figure 3:
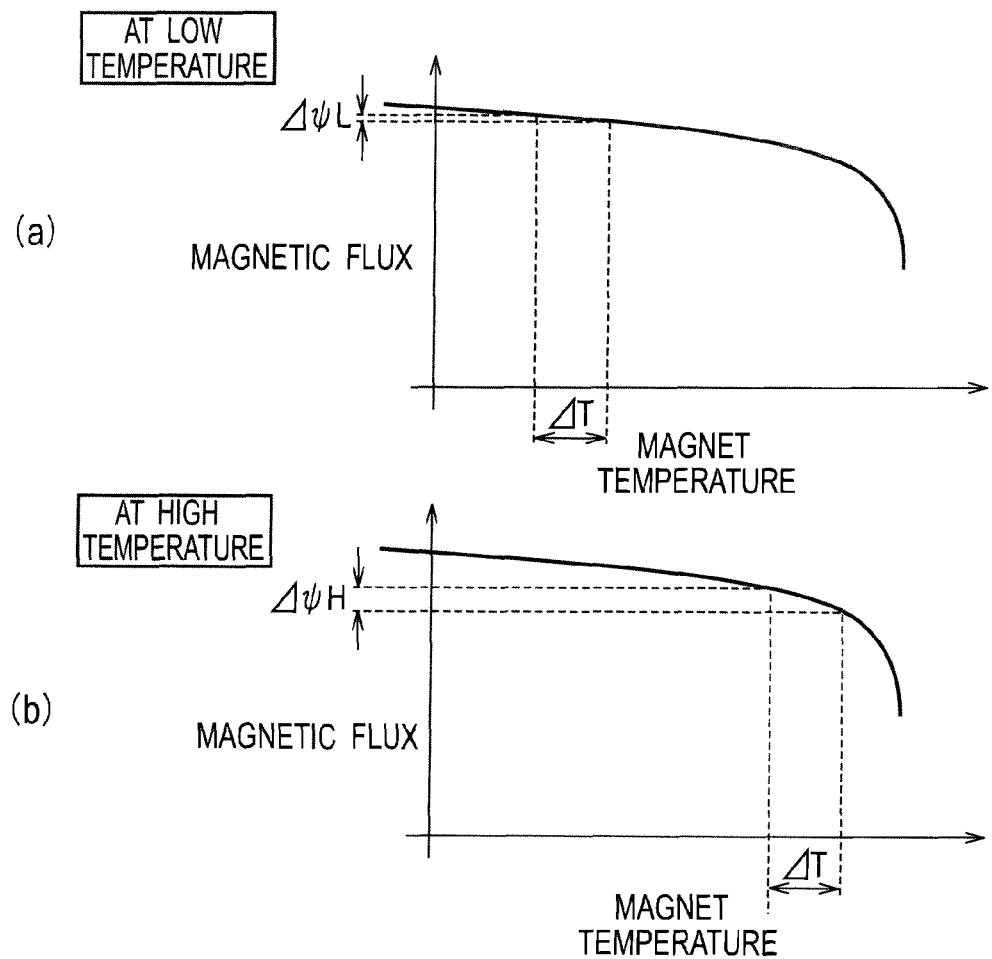
FIG. 3 shows magnetic flux differences between a first electric motor and a second electric motor when the magnet temperature of the first electric motor and the magnet temperature of the second electric motor have a certain temperature difference $\Delta T$, where the magnetic flux differences are shown by comparing when the permanent magnets of the electric motors have a relatively low temperature with when the permanent magnets of the electric motors have a relatively high temperature.

FIG. 3 shows magnetic flux differences between the first and second electric motors 1, 2 when the magnet temperature of the first electric motor 1 and the magnet temperature of the second electric motor 2 have a certain temperature difference ΔT, where the magnetic flux differences are shown by comparing when the permanent magnets of the electric motors 1, 2 have a relatively low temperature with when the permanent magnets of the electric motors 1, 2 have a relatively high temperature. Herein, FIG. 3(a) shows a magnetic flux difference ΔψL obtained when the permanent magnets of the electric motors 1, 2 have the relatively low temperature while FIG. 3(b) shows a magnetic flux difference ΔψH obtained when the permanent magnets of the electric motors 1, 2 have the relatively high temperature.

As obvious from FIG. 3, the decrease allowance of the magnetic flux becomes larger as the magnet temperature is higher, thereby, the magnetic flux differences are expressed by |ΔψL|<|ΔψH| even when a temperature difference ΔT between the electric motors 1, 2 is equal. Herein, in each of the electric motors 1, 2, the magnetic flux is proportional to the interlinkage magnetic flux, therefore, the absolute value of the difference Φml−Φmr of the interlinkage magnetic fluxes of the expression (3) is also increased as the magnet temperature of each of the electric motors 1, 2 becomes higher. Thus, observing a change ratio d(|Φml−Φmr|)/dt of time change of the absolute value of the difference Φml−Φmr of the interlinkage magnetic fluxes can determine that, when the change ratio d(|Φml−Φmr|)/dt is more than a predetermined threshold, the permanent magnet of the first electric motor 1 or second electric motor 2 whichever has at least a lower q-axis voltage command value (Vql*, Vqr*) has a high temperature. Then, when it is determined that the magnet temperature is high, a measure such as to decrease the torque command value τ* is to be taken. The above measure can prevent such a situation that a significant output decrease of the electric motor is caused by an irreversible demagnetization attributable to temperature increase of the permanent magnet.

Figure 4:
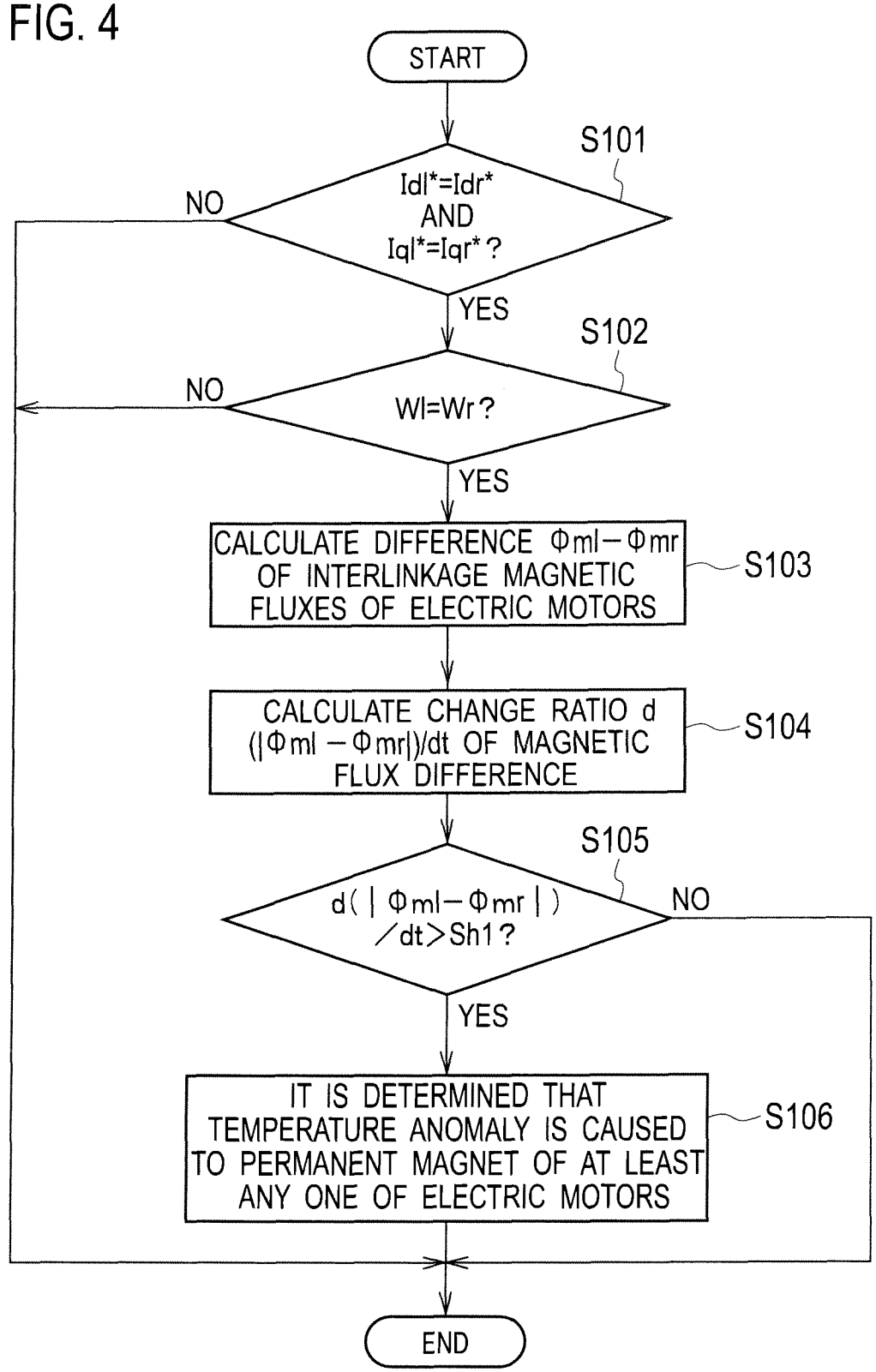
FIG. 4 is a flowchart showing the flow of processings implemented at a magnet temperature anomaly detector provided in a microcomputer in the driving control system of the electric vehicle according to the first embodiment.

In the driving control system 100 according to the first embodiment, the magnet temperature anomaly detector 30 provided in the microcomputer 5 implements the above processings. FIG. 4 shows a flowchart of the processings implemented by the magnet temperature anomaly detector 30. The anomaly detection processing shown by the flowchart of FIG. 4 is implemented as an interruption processing of the microcomputer 5 per predetermined period (for example, 1 second).

<Step S101>

When the flow in FIG. 4 is started, the magnet temperature anomaly detector 30 firstly at step S101 determines whether or not the current command values Idl*, Iql* corresponding to the first electric motor 1 are respectively equal to the current command values Idr*, Iqr* corresponding to the second electric motor 2.

<Step S102>

Next, when the current command values (i.e. Idl* and Idr*, Iql* and Iqr*) corresponding to the electric motors 1, 2 are respectively equal, it is determined at the subsequent step S102 whether or not the rotor rotation speed Wl of the first electric motor 1 is equal to the rotor rotation speed Wr of the second electric motor 2.

<Step S103>

When the rotor rotation speeds Wl, Wr of the respective electric motors 1, 2 are equal, the difference Φml−Φmr of the interlinkage magnetic fluxes of the electric motors 1, 2 is calculated at the subsequent step S103 based on the difference Vql*−Vqr*, that is, the q-axis voltage command value Vql* corresponding to the first electric motor 1 and the q-axis voltage command value Vqr* corresponding to the second electric motor 2.

<Step S104>

Next, at step S104, from the past magnetic flux difference calculated up to the previous processing period and the magnetic flux difference calculated in the present processing period, the change ratio d(|Φml−Φmr|)/dt of the magnetic flux difference is calculated.

<Step S105>

Next, at step S105, it is determined whether or not the value of the change ratio d(|Φml−Φmr|)/dt of the magnetic flux difference calculated at step S104 is more than a predetermined threshold Sh1 set in advance. In addition, in the permanent magnets of the first electric motor 1 and second electric motor 2, the relation between the magnet temperature and the change ratio d(|Φml−Φmr|)/dt of the magnetic flux difference is determined according to performances and the like of the electric motors 1, 2, therefore, an optimum value as the predetermined threshold S1 may have been calculated by implementing experiments and the like in advance using an actual equipment.

<Step S106>

Next, as a result of the determination at step S105, when it is determined that the change ratio d(|Φml−Φmr|)/dt of the magnetic flux difference is more than the predetermined threshold Sh1, it is determined at step S106 that the temperature anomaly is caused to the permanent magnet of at least any one of the first electric motor 1 and the second electric motor 2, thereby, a processing (such as downward adjustment of the torque command value τ*) for preventing an irreversible demagnetization of the permanent magnet is implemented.

When it is determined to be NO at any of the step S101, step S102 and step S105, the anomaly detection processing in the present processing period is ended, waiting for the start of the anomaly detection processing in the subsequent processing period.

As set forth in detail above by citing specific examples, in the driving control system 100 of the electric vehicle according to the first embodiment, under the condition that the corresponding rotor rotation speeds ωes (i.e., ωel and ωer) have the same value, the corresponding winding wire currents Id, Iq (i.e., Idl and Idr, Iql and Iqr) have the same value, and the corresponding winding wire inductances Ld, Lq (i.e., Ldl and Ldr, Lql and Lqr) have the same value in the electric motors 1, 2, the change ratio d(|Φml−Φmr|)/dt of the magnetic flux difference of the electric motors 1, 2 is calculated based on the difference Vql*−Vqr* between the q-axis voltage command value Vql* corresponding to the first electric motor 1 and the q-axis voltage command value Vqr corresponding to the second electric motor 2, and then when the change ratio d(|Φml−Φmr|)/dt of the magnetic flux difference is more than the predetermined threshold Sh1, it is determined that the permanent magnet of at least any one of the electric motors 1, 2 has the temperature anomaly. Thus, when the left and right wheels have the same torque and the same rotation speed in such a situation that the electric vehicle is making a straight movement, the driving control system 100 can detect the temperature anomaly of the permanent magnet with a high accuracy. In this case, it is not necessary to directly measure the temperature of the permanent magnet of each of the electric motors 1, 2 by means of a temperature sensor and the like.

In the electric motors 1, 2, even when the corresponding rotor rotation speeds ωes (i.e., ωel and ωer) are different, the corresponding winding wire currents Id, Iq (i.e., Idl and Idr, Iql and Iqr) are different, and the corresponding winding wire inductances Ld, Lq (i.e., Ldl and Ldr, Lql and Lqr) are different, provided that the values of the winding wire inductances Ld, Lq (i.e., Ldl and Ldr. Lql and Lqr) are known, the above expressions (1), (2) can calculate the difference Φml–Φmr of the interlinkage magnetic fluxes of the electric motors 1, 2 from the difference Vql–Vqr between the q-axis voltage Vql of the first electric motor 1 and the q-axis voltage Vqr of the second electric motor 2. Herein, since the winding wire inductances Ld, Lq depend on the d-axis currents Ldl, Ldr or the q-axis currents Iql, Iqr, a map showing the d-axis currents Ldl, Ldr and q-axis currents Iql, Iqr relative to the winding wire inductances Ld, Lq is developed through previous experiments and the like and memorized, to thereby make it possible to calculate the change ratio d(|Φml–Φmr|)/dt of the magnetic flux difference of the electric motors 1, 2 based on the difference Vql*–Vqr* between the q-axis voltage command value Vql* corresponding to the first electric motor 1 and the q-axis voltage command value Vqr* corresponding to the second electric motor 2 and to determine, by comparison of the change ratio d(|Φml–Φmr|)/dt of the magnetic flux difference with the predetermined threshold Sh1, whether or not the temperature anomaly of the permanent magnet of any of the electric motors 1, 2 is caused. As stated above, in the driving control system 100 of the electric vehicle according to the first embodiment, memorizing the map showing the d-axis currents Idl, Idr and q-axis currents Iql, Iqr relative to the wining wire inductances Ld, Lq can detect the temperature anomaly of the permanent magnet with a high accuracy even when the left and right wheels are different in torque or rotation speed in such a situation that the electric vehicle makes a turn. In this case, it is not necessary to directly measure the temperature of the permanent magnet of each of the electric motors 1, 2 by means of a temperature sensor and the like.

Moreover, in the driving control system 100 of the electric vehicle according to the first embodiment, the change ratio d(|Φml–Φmr|)/dt of the magnetic flux difference of the electric motors 1, 2 is calculated and whether or not the temperature anomaly of the permanent magnets of the electric motors 1, 2 is caused is determined by comparing the change ratio d(|Φml–Φmr|)/dt of the magnetic flux difference with the predetermined threshold Sh1, thereby, the temperature anomaly can be detected not only when the temperature anomaly is caused to the permanent magnet of only one of the electric motors 1, 2 but also when the temperature anomaly is caused simultaneously to the permanent magnets of both the electric motors 1, 2.

In addition, when whether or not the temperature anomaly of the permanent magnets of the electric motors 1, 2 is caused is determined under the condition that the corresponding rotor rotation speeds ωes (i.e., ωel and ωer) have the same value, the corresponding winding wire currents Id, Iq (i.e., Idl and Idr, Iql and Iqr) have the same value, and the corresponding winding wire inductances Ld, Lq (i.e., Ldl and Ldr, Lql and Lqr) have the same value in the first and second electric motors 1, 2 in such an occasion that the electric vehicle is making a straight movement, the difference Vql–Vqr of the q-axis voltages Vql, Vqr of the electric motors 1, 2 is so expressed as to be close to being proportional to the difference Φml–Φmr of the interlinkage magnetic fluxes of the electric motors 1, 2, as obvious from the above expression (3). Thus, in this case, without calculating the difference Φml–Φmr of the interlinkage magnetic fluxes of the electric motors 1, 2, the time change of the difference Vql*–Vqr* between the q-axis voltage command value Vql* corresponding to the first electric motor 1 and the q-axis voltage command value Vqr* corresponding to the second electric motor 2, that is, the change ratio d(|Vql–Vqr|)/dt of the time change of the difference Vql–Vqr of the q-axis voltages Vql, Vqr of the electric motors 1, 2 is calculated, and when the change ratio d(|Vql–Vqr|)/dt of the q-axis voltage difference is more than a predetermined threshold Sh2, it may be determined that the temperature anomaly is caused to the permanent magnet to at least any one of the electric motors 1, 2. In this way, when whether or not the temperature anomaly is caused to the permanent magnets of the electric motors 1, 2 is determined by comparing the change ratio d(|Vql–Vqr|)/dt of the q-axis voltage difference of the electric motors 1, 2 with the predetermined threshold Sh2, the determination accuracy is slightly lower than when the determination is made by comparing the change ratio d(|Φml–Φmr|)/dt of the magnetic flux difference with the predetermined threshold Sh1, however, the calculation of the difference Φml–Φmr of the interlinkage magnetic fluxes of the electric motors 1, 2 is not necessary, thus making it possible to decrease the calculation load by an amount equivalent to the unnecessary calculation. In addition, in the permanent magnets of the first electric motor 1 and second electric motor 2, the relation between the magnet temperature and the change ratio d(|Vql–Vqr|)/dt of the q-axis voltage difference is determined according to performances and the like of the electric motors 1, 2, therefore, an optimum value as the predetermined threshold S2 may have been calculated by implementing experiments and the like in advance using an actual equipment.

Moreover, according to the above example, comparing the change ratio d(|Φml–Φmr|)/dt of the magnetic flux difference of the electric motors 1, 2 with the predetermined threshold Sh1 or comparing the change ratio d(|Vql–Vqr|)/dt of the q-axis voltage difference of the electric motors 1, 2 with the predetermined threshold Sh2 determines whether or not the temperature anomaly is caused to the permanent magnets of the electric motors 1, 2. However, without the need of calculating the change ratio of time change of each value, comparing the value per se of the difference Φml–Φmr of the interlinkage magnetic fluxes of the electric motors 1, 2 with a predetermined threshold Sh3 or comparing the value per se of the difference Vql–Vqr of the q-axis voltages of the electric motors 1, 2 with a predetermined threshold Sh4 can also determine whether or not the temperature anomaly is caused to the permanent magnets of the electric motors 1, 2. However, in these cases, the determination that the temperature anomaly is caused is implemented when the temperature of only one of the two electric motors 1, 2 is increased to thereby increase the temperature difference between the electric motors 1, 2.

(Second Embodiment)

Next, the second embodiment of the present invention will be set forth. Like the first embodiment, the anomaly detector of the present invention as a function of the microcomputer 5 incorporated in the inverter 3 is realized according to the second embodiment, where the control structure is like that of the first embodiment, however, the processing at the magnet temperature anomaly detector 30 provided in the microcomputer 5 is slightly different from that of the first embodiment. That is, according to the first embodiment, the anomaly of the magnet temperature is detected by using the difference Vql−Vqr between the q-axis voltage Vql of the first electric motor 1 and the q-axis voltage Vqr of the second electric motor 2, however, according to the second embodiment, a ratio Vqr/Vql of the q-axis voltages is calculated in addition to the difference Vql−Vqr of the q-axis voltages of the electric motors 1, 2 and the temperature anomaly of the permanent magnets of the electric motors 1, 2 is calculated by using both the difference Vql−Vqr of the q-axis voltages and the ratio Vqr/Vql of the q-axis voltages. Hereinafter, only differences of the second embodiment from those of the first embodiment will be set forth.

Taking the ratio Vqr/Vql of the q-axis voltage Vqr of the second electric motor 2 to the q-axis voltage Vql of the first electric motor 1 from the above expressions (1) and (2) gives the following expression (4).

$$Vqr/Vql = (\omega er \cdot Ldr \cdot Idr + Rr \cdot Iqr + p \cdot Lqr \cdot Iqr + \omega er \cdot \Phi mr) / (\omega el \cdot Ldl \cdot Idl + Rl \cdot Iql + p \cdot Lql \cdot Iql + \omega el \cdot \Phi ml) \quad (4)$$

where under a condition that the winding wire currents Id, Iq (Idl, Iql; Idr, Iqr) of the electric motors 1, 2 are each 0, the expression (4) can be simplified to the following expression (5).

$$Vqr/Vql = (\omega er \cdot \Phi mr)/(\omega el \cdot \Phi ml) \quad (5)$$

Herein, when the permanent magnet of only the first electric motor 1 causes the temperature increase, the interlinkage magnetic flux Φml of the first electric motor 1 is decreased thereby the denominator of the above expression (5) becomes smaller thus making the value of the above expression (5) more than 1. On the other hand, when the permanent magnet of only the second electric motor 2 causes the temperature increase, the interlinkage magnetic flux Φmr of the second electric motor 2 is decreased thereby the numerator of the above expression (5) becomes smaller thus making the value of the above expression (5) less than 1. Thus, whether the expression (5) is more than 1 or less than 1 can determine which of the electric motors 1, 2 has the permanent magnet that causes the high temperature. When the permanent magnet of the first electric motor 1 has the high temperature, it can be determined that the permanent magnet of the first electric motor 1 causes the temperature anomaly provided that the value of the expression (5) is higher than a predetermined threshold. Meanwhile, when the permanent magnet of the second electric motor 2 has the high temperature, it can be determined that the permanent magnet of the second electric motor 2 causes the temperature anomaly provided that the value of the expression (5) is lower than a predetermined threshold.

Then, in the driving control system 100 of the electric vehicle according to the second embodiment, at a timing at which the winding wire currents Id, Iq (Idl, Iql; Idr, Iqr) of the electric motors 1, 2 are each 0, the magnet temperature anomaly detector 30 provided in the microcomputer 5 calculates the ratio Vqr/Vql of the q-axis voltages of the electric motors 1, 2 by using the q-axis voltage command value Vql* calculated by the current controller 18 of the first vector controller 15 and the q-axis voltage command value Vqr* calculated by the current controller 28 of the second vector controller 25. Then, when the value of the ratio Vqr/Vql of the q-axis voltages of the electric motors 1, 2 is more than 1, it is determined that the temperature anomaly is caused to the permanent magnet of the first electric motor 1 provided that the value of the ratio Vqr/Vql is higher than a predetermined threshold Sh5. Meanwhile, when the value of the ratio Vqr/Vql of the q-axis voltages of the electric motors 1, 2 is less than 1, it is determined that the temperature anomaly is caused to the permanent magnet of the second electric motor 2 provided that the value of the ratio Vqr/Vql is lower than a predetermined threshold Sh6. Then, when it is determined that the temperature anomaly is caused to the permanent magnet of any of the electric motors 1, 2, a measure such as to decrease the torque command value τ* is to be taken, like the first embodiment. The above measure can prevent such a situation that a significant output decrease of the electric motor is caused by an irreversible demagnetization attributable to temperature increase of the permanent magnet.

In this regard, when the value especially on the denominator side is minor, the calculation using the ratio Vqr/Vql of the q-axis voltages of the electric motors 1, 2 makes calculation errors greater, thus deteriorating the determination accuracy. Therefore, a lower limit ("Vq_L" to be described afterward) to the value of the q-axis voltage of each of the electric motors 1, 2 is determined in advance, and only when the q-axis voltage command values Vql*, Vqr* of the respective electric motors 1, 2 are each more than or equal to the lower limit ("Vq_L" to be described afterward), the magnet temperature anomaly detector 30 implements the determination of the temperature anomaly of the permanent magnet by using the ratio of the q-axis voltages of the electric motors 1, 2, and when at least any one of the q-axis voltage command values Vql*, Vqr* of the respective electric motors 1, 2 is less than the lower limit ("Vq_L" to be described afterward), the determination of the temperature anomaly of the permanent magnet is implemented by using the difference Vql−Vqr of the q-axis voltages of the electric motors 1, 2 as set forth according to the first embodiment.

Figure 5:
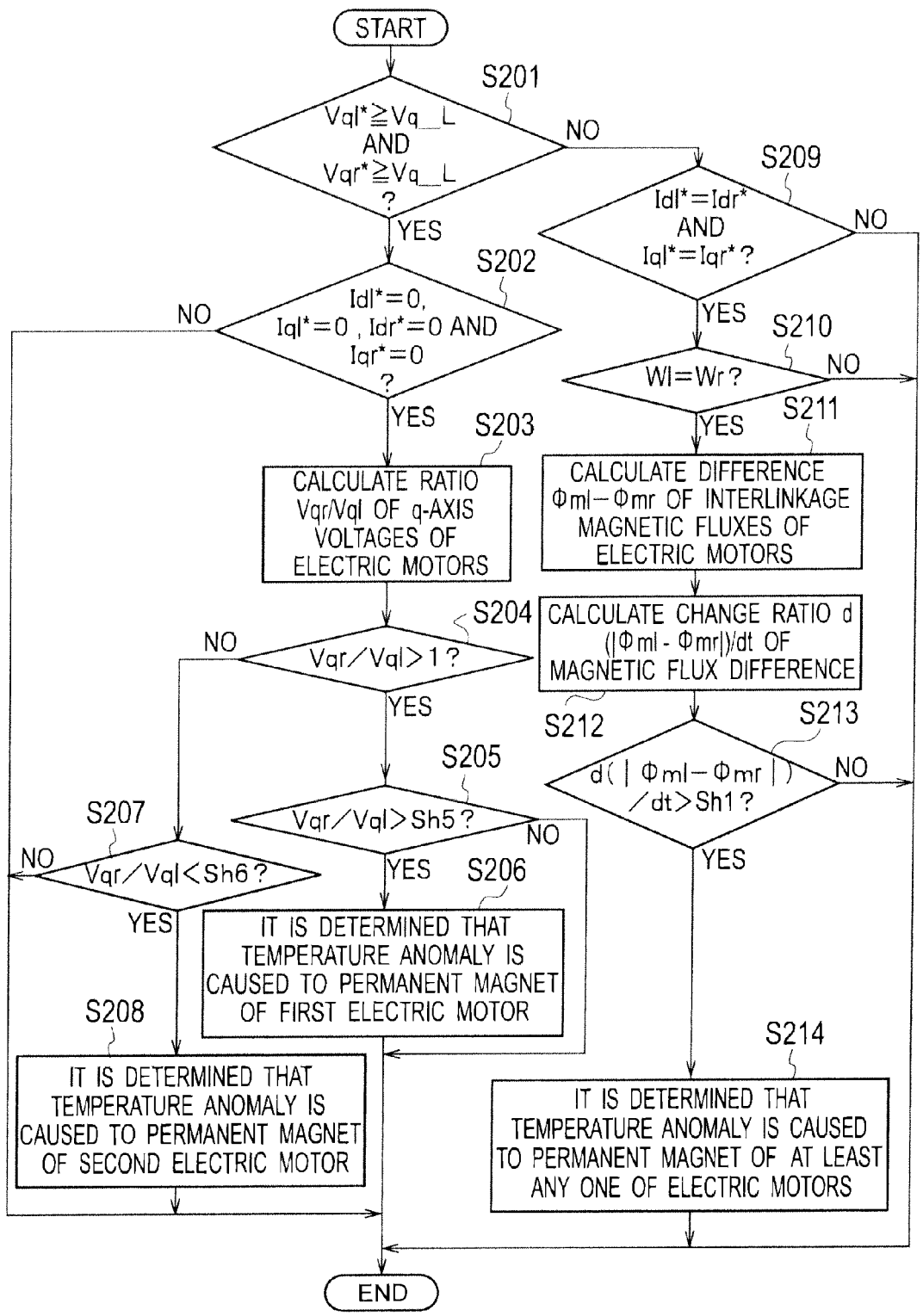
FIG. 5 is a flowchart showing the flow of processings implemented at the magnet temperature anomaly detector provided in the microcomputer in the driving control system of the electric vehicle according to the second embodiment.

FIG. 5 is a flowchart showing the flow of processings implemented at the magnet temperature anomaly detector 30 provided in the microcomputer 5 in the driving control system 100 of the electric vehicle according to the second embodiment. The anomaly detection processing shown by the flowchart of FIG. 5 is implemented as an interruption processing of the microcomputer 5 per predetermined period (for example, 1 second).

<Step S201>

When the flow in FIG. 5 is started, the magnet temperature anomaly detector 30 firstly at step S201 determines whether or not the q-axis voltage command value Vql* corresponding to the first electric motor 1 and the q-axis voltage command value Vqr* corresponding to the second electric motor 2 are each more than or equal to the lower limit Vq_L. Then, when both of the q-axis voltage command values Vql*, Vqr* are more than or equal to the lower limit Vq_L, the process moves to step S202 meanwhile when at least one of the q-axis voltage command values Vql*, Vqr* is less than the lower limit Vq_L, the process moves to step S209.

<Step S202>

At step S202, it is determined whether or not the current command values Idl*, Iql* corresponding to the first electric motor 1 and the current command values Idr*, Iqr* corresponding to the second electric motor 2 are each 0.

<Step S203>

Then, when the current command values (Idl*, Iql*; Idr*, Iqr*) corresponding to the electric motors 1, 2 are each 0, the ratio Vqr/Vql of the q-axis voltages of electric motors 1, 2 are calculated at the subsequent step S203 from the q-axis voltage command value Vql* corresponding to the first electric motor 1 and the q-axis voltage command value Vqr* corresponding to the second electric motor 2.

<Step S204>

Next, at step S204, it is determined whether or not the value of the ratio Vqr/Vql of the q-axis voltages of the electric motors 1, 2 calculated at step S203 is more than 1.

<Step S205>

When the value of the ratio Vqr/Vql of the q-axis voltages of the electric motors 1, 2 is more than 1, it is determined at step S205 whether or not the value of the ratio Vqr/Vql of the q-axis voltages of the electric motors 1, 2 calculated at step S203 is more than the predetermined threshold Sh5.

<Step S206>

Next, when the value of the ratio Vqr/Vql of the q-axis voltages of the electric motors 1, 2 is more than the predetermined threshold Sh5, it is determined at step S206 that the temperature anomaly is caused to the permanent magnet of the first electric motor 1, thereby, a processing (such as downward adjustment of the torque command value τ*) for preventing an irreversible demagnetization of the permanent magnet is implemented.

<Step S207>

On the other hand, when the value of the ratio Vqr/Vql of the q-axis voltages of the electric motors 1, 2 is less than 1, it is determined at step S207 whether or not the value of the ratio Vqr/Vql of the q-axis voltages of the electric motors 1, 2 is less than the predetermined threshold Sh6.

<Step S208>

When the value of the ratio Vqr/Vql of the q-axis voltages of the electric motors 1, 2 is less than the predetermined threshold Sh6, it is determined at step S208 that the temperature anomaly is caused to the permanent magnet of the second electric motor 2, thereby, a processing (such as downward adjustment of the torque command value τ*) for preventing an irreversible demagnetization of the permanent magnet is implemented.

As the predetermined thresholds Sh5. Sh6, optimum values may have been calculated by implementing in advance experiments and the like using an actual equipment. When it is determined to be NO at any of the above steps S202, S205, S207, the anomaly detection processing in the present processing period is ended, waiting for the start of the anomaly detection processing at the subsequent processing period.

Moreover, when it is determined at step S201 that at least one of the q-axis voltage command value Vql* corresponding to the first electric motor 1 and the q-axis voltage command value Vqr* corresponding to the second electric motor 2 is less than the lower limit Vq_L and then the process moves to step S209, the determination of the temperature anomaly of the permanent magnet is to be implemented at processings after step S209 by using the difference Vql-Vqr of the q-axis voltages of the electric motors 1, 2, like the first embodiment.

<Step S209>

That is, firstly at step S209, it is determined whether or not the current command values Idl*, Iql* corresponding to the first electric motor 1 are respectively equal to the current command values Idr*, Iqr* corresponding to the second electric motor 2.

<Step S210>

Next, when the present command values (i.e., Idl* and Idr*, Iql* and Iqr*) corresponding to the electric motors 1, 2 are respectively equal, it is determined at the subsequent step S210 whether or not the rotor rotation speed Wl of the first electric motor 1 is equal to the rotor rotation speed Wr of the second electric motor 2.

<Step S211>

When the rotor rotation speeds Wl, Wr of the respective electric motors 1, 2 are equal, the difference Φml−Φmr of the interlinkage magnetic fluxes of the electric motors 1, 2 is calculated at the subsequent step S211 based on the difference Vql*−Vqr*, that is, the q-axis voltage command value Vql* corresponding to the first electric motor 1 and the q-axis voltage command value Vqr* corresponding to the second electric motor 2.

<Step S212>

Next, at step S212, from the past magnetic flux difference calculated up to the previous processing period and the magnetic flux difference calculated in the present processing period, the change ratio d(|Φml−Φmr|)/dt of the magnetic flux difference is calculated.

<Step S213>

Next, at step S213, it is determined whether or not the change ratio d(|Φml−Φmr|)/dt of the magnetic flux difference calculated at step S212 is more than the predetermined threshold Sh1 set in advance.

<Step S214>

Next, as a result of the determination at step S213, when it is determined that the change ratio d(|Φml−Φmr|)/dt of the magnetic flux difference is more than the predetermined threshold Sh1, it is determined at step S214 that the temperature anomaly is caused to the permanent magnet of at least any one of the first electric motor 1 and the second electric motor 2, thereby, a processing (such as downward adjustment of the torque command value τ*) for preventing an irreversible demagnetization of the permanent magnet is implemented.

When it is determined to be NO at any of the step S209, step S210 and step S213, the anomaly detection processing in the present processing period is ended, waiting for the start of the anomaly detection processing in the subsequent processing period.

In the example shown by the flowchart in FIG. 5, when at least any one of the q-axis voltage command values Vql*, Vqr* is less than the lower limit Vq_L, the change ratio d(|Φml−Φmr|)/dt of the magnetic flux difference of the electric motors 1, 2 is calculated based on the difference Vql*−Vqr* and the temperature anomaly of the permanent magnets of the electric motors 1, 2 is detected by comparing the change ratio d(|Φml−Φmr|)/dt of the magnetic flux difference with the predetermined threshold Sh1 (S213). However, instead of comparing the change ratio d(|Φml−Φmr|)/dt of the magnetic flux difference of the electric motors 1, 2 with the predetermined threshold Sh1, comparing the change ratio d(|Vql−Vqr|)/dt of the q-axis voltage difference of the electric motors 1, 2 with the predetermined threshold Sh2, comparing the value per se of the difference Φml−Φmr of the interlinkage magnetic fluxes of the electric motors 1, 2 with the predetermined threshold Sh3, or comparing the value per se of the difference Vql−Vqr of the q-axis voltages of the electric motors 1, 2 with the predetermined threshold Sh4 may detect the temperature anomaly of the permanent magnets of the electric motors 1, 2, as set forth according to the first embodiment.

As set forth above by citing specific examples, in the driving control system 100 of the electric vehicle according to the second embodiment, when both the q-axis voltage command value Vql* corresponding to the first electric motor 1 and the q-axis voltage command value Vqr* corresponding to the second electric motor 2 are more than or equal to the lower limit Vq_L, the temperature anomaly of the permanent magnets of the electric motors 1, 2 is detected by using the ratio Vqr/Vql of the q-axis voltages of the electric motors 1, 2 under the condition that the winding wire currents Id, Iq (Idl, Iql; Idr, Iqr) of the electric motors 1, 2 are each 0, meanwhile, when at least any one of the q-axis voltage command values Vql*, Vqr* is less than the lower limit Vq_L, the temperature anomaly of the permanent magnets of the electric motors 1, 2 is detected by using the difference Vql*−Vqr* of the q-axis voltage command values Vql*, Vqr*. Thus, by the driving control system 100 according to the second embodiment, the situation that the temperature difference of the electric motors 1, 2 is getting greater can be determined, like the driving control system 100 according to the first embodiment. Thus, by the driving control system 100 according to the second embodiment, the temperature anomaly of the permanent magnet can be detected with a high accuracy without the need of directly measuring the temperature of the permanent magnet of each of the electric motors 1, 2 by means of a temperature sensor and the like.

Moreover, especially, in the driving control system 100 according to the second embodiment, detecting the temperature anomaly of the permanent magnets of the electric motors 1, 2 by using the ratio Vqr/Vql of the q-axis voltages of the electric motors 1, 2 can cancel an influence of a detection error of the direct current Vdc of the battery 4, which is an advantage. That is, a modulation factor of the PWM waveform generated by the first PWM controller 16 or second PWM controller 26 is determined based on the ratio of the voltage command value relative to the direct current voltage Vdc of the battery 4. By this, when the direct current voltage Vdc of the battery 4 has the detection error, the voltage command value for obtaining the same modulation factor may change. That is, in this case, the influence of the detection error of the direct current voltage Vdc of the battery 4 is superposed on the voltage command value. Herein, in the driving control system 100 according to the second embodiment, since both the first electric motor 1 and the second electric motor 2 obtain the power from the one battery 4, the same influence of the detection error of the direct current voltage Vdc is superposed on the voltage command values corresponding to the electric motors 1, 2. Thus, taking the ratio of the voltage command values corresponding to the electric motors 1, 2 can cancel the influence of the detection error of the direct current voltage Vdc. That is, in the ratio Vqr/Vql of the q-axis voltages of the above expression (5), the influence of the detection error of the direct current voltage Vdc is cancelled. Even when the direct current voltage Vdc of the battery 4 has the detection error, detecting the temperature anomaly of the permanent magnets of the electric motors 1, 2 by using the ratio Vqr/Vql of the q-axis voltages of the electric motors 1, 2 can detect the temperature anomaly of the permanent magnet with a high accuracy.

Now, according to the second embodiment, for calculating the difference Vql−Vqr and ratio Vql/Vqr of the q-axis voltage Vql of the first electric motor 1 and the q-axis voltage Vqr of the second electric motor 2, the difference Φml−Φmr of the interlinkage magnetic fluxes of the electric motors 1, 2 is calculated by the above expression (3) and the ratio Φmr/Φml of the interlinkage magnetic fluxes is calculated by the expression (5), thereby making it possible to calculate the values per se of the interlinkage magnetic fluxes Φml, Φmr of the respective electric motors 1, 2. Then, with the values of the interlinkage magnetic fluxes Φml, Φmr of the electric motors 1, 2 known, calculating the current command values corresponding to the respective electric motors 1, 2 by reflecting the values Φml, Φmr can improve a following performance of the electric motors 1, 2's actual output torque relative to the torque command value τ*. That is, changing the magnetic flux of each of the electric motors 1, 2 may change the torque outputted by one of the electric motors 1, 2 even when a constant winding wire current is energized. Therefore, the values per se of the interlinkage magnetic fluxes Φml, Φmr are calculated from the difference Φml−Φmr and ratio Φmr/Φml of the interlinkage magnetic fluxes of the electric motors 1, 2 and the thus calculated values of the interlinkage magnetic fluxes Φml, Φmr are inputted to the current command converter 6. Then, based on the torque command value τ* and the values of the interlinkage magnetic fluxes Φml, Φmr, the current command converter 6 determines the current command values, to thereby make it possible to output a torque that accurately follows the torque command value τ*. In addition, the current command converter 6 can implement the above processings by mapping and memorizing, for example, the torque command value τ*, the magnetic flux and the relation between the magnetic flux and the d-axis current command values Idl*, Idr* and q-axis current command values Iql*, Iqr* which correspond to the magnetic flux.

Moreover, when the values per se of the interlinkage magnetic fluxes Φml, Φmr of the electric motors 1, 2 are calculated from the difference Vql−Vqr and ratio Vqr/Vql of the q-axis voltages of the electric motors 1, 2, comparing the values per se of the interlinkage magnetic fluxes Φml, Φmr with a predetermined threshold Sh7 can more accurately detect the temperature anomaly of the permanent magnets of the electric motors 1, 2.

(Third Embodiment)

Next, the third embodiment of the present invention will be set forth. According to the third embodiment, on the premise that the temperature anomaly of the permanent magnets of the electric motors 1, 2 is detected by a method same as that according to the second embodiment, positively providing a timing at which the winding wire currents Id, Iq (Idl, Iql; Idr, Iqr) of the electric motors 1, 2 are each 0 increases a scene which makes it possible to implement the determination by using the ratio Vqr/Vql of the q-axis voltages. Hereinafter, only differences of the third embodiment from those of the second embodiment will be set forth.

As shown by the above expression (5) set forth according to the second embodiment, under the condition that the winding wire currents Id, Iq (Idl, Iql; Idr, Iqr) of the electric motors 1, 2 are each 0, the terms of the winding wire resistance R and the terms of the winding wire inductances Ld, Lq in the above expression (4) can be deleted, thus making the q-axis voltages Vql, Vqr of the electric motors 1, 2 proportional to the magnetic fluxes (interlinkage magnetic fluxes) Φml, Φmr of the electric motors 1, 2. Thus, when the winding wire currents Id, Iq (Idl, Iql; Idr, Iqr) of the electric motors 1, 2 are each 0 in accordance with the processing of the magnet temperature anomaly detector 30, the scene which makes it possible to determine the anomaly of the magnet temperature by using the ratio Vqr/Vql of the q-axis voltages of the electric motors 1, 2 is increased. However, since the driving torque of the electric vehicle is ordinarily determined according to the acceleration operation amount of the driver, the timing at which the winding wire currents Id, Iq (Idl, Iql; Idr, Iqr) of the electric motors 1, 2 are each 0 is not periodically caused per processing period (for example, 1 second) of the magnet temperature anomaly detector 30.

Figure 6:
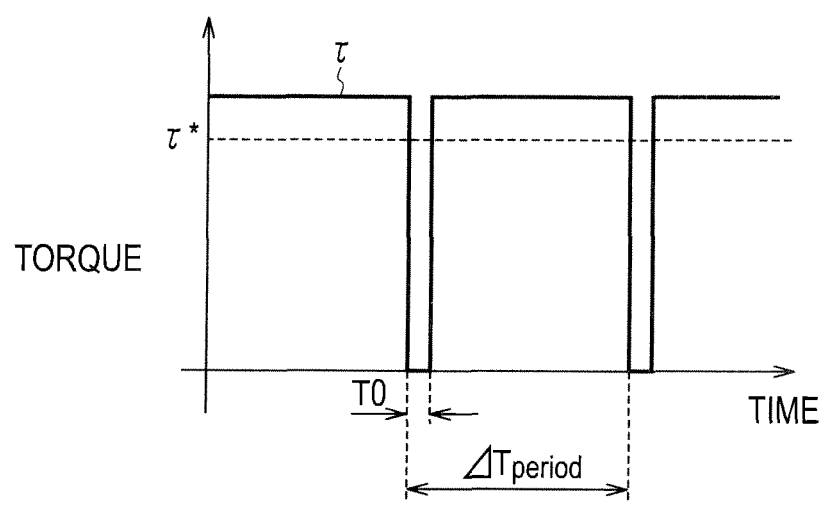
FIG. 6 is a drawing for explaining the third embodiment, showing a time chart explaining an example that the time average of the output torque of the first and second electric motors is allowed to match with the torque command value while a period in which the winding wire currents of the two electric motors are each 0 is provided.

Therefore, in the driving control system 100 of the electric vehicle according to the third embodiment, the current command converter 6 of the microcomputer 5 generates the current command values Id*, Iq* (Idl*, Iql*; Idr*, Iqr*) relative to the electric motors 1, 2 such that the time average of the torque τ actually outputted by the electric motors 1, 2 is allowed to match with the torque command value τ* (i.e., time average of torque τ is allowed to follow the torque command value τ*) as shown in FIG. 6 while a period T0 in which the winding wire currents Id, Iq (Idl, Iql; Idr, Iqr) of the electric motors 1, 2 are each 0 is formed. Then, a period ΔTperiod for providing the period T0 in which the winding wire currents Id, Iq (Idl, Iql; Idr, Iqr) of the electric motors 1, 2 are each 0 is set, for example, per 1 second, to thereby synchronize this operation with the interruption processing by the magnet temperature anomaly detector 30. By this operation, a timing at which the winding wire currents Id, Iq (Idl, Iql; Idr, Iqr) of the electric motors 1, 2 are each 0 can be generated in accordance with the processing of the magnet temperature anomaly detector 30, and the scene which makes it possible to implement the anomaly determination of the magnet temperature by using the ratio Vqr/Vql of the q-axis voltages of the electric motors 1, 2 can be increased.

As set forth above, by the driving control system 100 of the electric vehicle according to the third embodiment, the current command converter 6 of the microcomputer 5 generates the current command values Id*, Iq* (Idl*, Iql*; Idr*, Iqr*) relative to the electric motors 1, 2 such that the time average of the torque τ actually outputted by the electric motors 1, 2 is allowed to follow the torque command value τ* while the period T0 in which the winding wire currents Id, Iq (Idl, Iql; Idr, Iqr) of the electric motors 1, 2 are each 0 is formed. Thus, the effect by the second embodiment can be exerted to a maximum extent without causing any inconvenience such as an inadvertent fluctuation of the output torque of the electric motors 1, 2.

Although the present invention has been described above by reference to the first to third embodiments, each of these embodiments merely exemplifies one example of application of the present invention and therefore it is not intended that the scope of technology of the present invention is limited to the disclosure of these embodiments. That is, the scope of technology of the present invention is not limited to the specific technical matters disclosed in each of the above embodiments and may include various deformations, changes, alternative technologies and the like which can be easily led by the above disclosure.

The entire content of Japanese Patent Application No. P2009-198041 (filed on Aug. 28, 2009 in Japan) is herein incorporated by reference, thereby protecting this application from erroneous transitions or omitted descriptions.

Industrial Applicability

According to the present invention, the difference of the q-axis voltage command values relative to the permanent magnet synchronous motors is used for determining whether or not an anomaly of the magnet temperature is caused to at least any one of the permanent magnet synchronous motors. Thus, without the need of directly measuring the temperature of the permanent magnet of each of the permanent magnet synchronous motors by means of a temperature sensor and the like, the anomaly of the magnet temperature of the permanent magnet synchronous motors each used as an electric motor for an electric vehicle can be accurately detected.

The invention claimed is:

1. An anomaly detector of a permanent magnet synchronous electric motor, comprising:
   a plurality of permanent magnet synchronous electric motors;
   a current command value calculator for calculating current command values relative to the plurality of the permanent magnet synchronous electric motors;
   q-axis voltage command value calculators for calculating each of q-axis voltage command values relative to the plurality of the permanent magnet synchronous electric motors based on the current command values each calculated by the current command value calculator; and
   a magnet temperature anomaly determiner for determining whether or not an anomaly of a magnet temperature is caused to at least any one of the permanent magnet synchronous electric motors, the determining operation being implemented by using a difference between:
      a q-axis voltage command value which is calculated by one of the q-axis voltage command value calculators and is relative to one permanent magnet synchronous electric motor of the plurality of the permanent magnet synchronous electric motors, and
      a q-axis voltage command value which is calculated by another of the q-axis voltage command value calculators and is relative to another permanent magnet synchronous electric motor of the plurality of the permanent magnet synchronous electric motors.

2. The anomaly detector of the permanent magnet synchronous electric motor according to claim 1 wherein
   when the difference between the q-axis voltage command value relative to the one permanent magnet synchronous electric motor of the plurality of the permanent magnet synchronous electric motors and the q-axis voltage command value relative to the other permanent magnet synchronous electric motor of the plurality of the permanent magnet synchronous electric motors is more than a predetermined threshold set in advance, the magnet temperature anomaly determiner determines that the anomaly of the magnet temperature is caused to at least any one of the permanent magnet synchronous electric motors.

3. The anomaly detector of the permanent magnet synchronous electric motor according to claim 1 wherein
   the magnet temperature anomaly determiner calculates a change ratio of a time change of the difference between the q-axis voltage command value relative to the one permanent magnet synchronous electric motor of the plurality of the permanent magnet synchronous electric motors and the q-axis voltage command value relative to the other permanent magnet synchronous electric motor of the plurality of the permanent magnet synchronous electric motors, and
   when the change ratio is more than a predetermined threshold set in advance, the magnet temperature anomaly determiner determines that the anomaly of the magnet temperature is caused to at least any one of the permanent magnet synchronous electric motors.

4. The anomaly detector of the permanent magnet synchronous electric motor according to claim 2 wherein
   in the plurality of the permanent magnet synchronous electric motors, when corresponding rotor rotation speeds are substantially equal, corresponding winding wire currents are substantially equal and corresponding winding wire inductances are substantially equal, the magnet temperature anomaly determiner implements the determining of the anomaly of the magnet temperature.

5. The anomaly detector of the permanent magnet synchronous electric motor according to claim 1 wherein
   the magnet temperature anomaly determiner uses:
      the difference between the q-axis voltage command value relative to the one permanent magnet synchronous electric motor of the plurality of the permanent magnet synchronous electric motors and the q-axis voltage command value relative to the other permanent magnet synchronous electric motor of the plurality of the permanent magnet synchronous electric motors,
      rotor rotation speeds of the permanent magnet synchronous electric motors, and
      winding wire currents of the permanent magnet synchronous electric motors,
      to thereby calculate a difference of interlinkage magnetic fluxes of the permanent magnet synchronous electric motors, and when the difference of the interlinkage magnetic fluxes is more than a predetermined threshold set in advance, the magnet temperature anomaly determiner determines that the anomaly of the magnet temperature is caused to at least any one of the permanent magnet synchronous electric motors.

6. The anomaly detector of the permanent magnet synchronous electric motor according to claim 1 wherein
the magnet temperature anomaly determiner uses:
the difference between the q-axis voltage command value relative to the one permanent magnet synchronous electric motor of the plurality of the permanent magnet synchronous electric motors and the q-axis voltage command value relative to the other permanent magnet synchronous electric motor of the plurality of the permanent magnet synchronous electric motors,
rotor rotation speeds of the permanent magnet synchronous electric motors, and
winding wire currents of the permanent magnet synchronous electric motors,
to thereby calculate a difference of interlinkage magnetic fluxes of the permanent magnet synchronous electric motors, and
the magnet temperature anomaly determiner calculates a change ratio of a time change of the difference of the interlinkage magnetic fluxes, and
when the change ratio is more than a predetermined threshold, the magnet temperature anomaly determiner determines that the anomaly of the magnet temperature is caused to at least any one of the permanent magnet synchronous electric motors.

7. The anomaly detector of the permanent magnet synchronous electric motor according to claim 5 wherein
in the plurality of the permanent magnet synchronous electric motors, when the corresponding rotor rotation speeds are substantially equal, the corresponding winding wire currents are substantially equal and the corresponding winding wire inductances are substantially equal, the magnet temperature anomaly determiner implements the determining of the anomaly of the magnet temperature.

8. The anomaly detector of the permanent magnet synchronous electric motor according to claim 5, further comprising:
a memory for memorizing a map showing a relation between a d-axis current and a winding wire inductance and a relation between a q-axis current and the winding wire inductance,
wherein
the magnet temperature anomaly determiner calculates the winding wire inductances of the plurality of the permanent magnet synchronous electric motors from the current command values calculated by the current command value calculator and from the map memorized in the memory,
the magnet temperature anomaly determiner uses:
the difference between the q-axis voltage command value relative to the one permanent magnet synchronous electric motor of the plurality of the permanent magnet synchronous electric motors and the q-axis voltage command value relative to the other permanent magnet synchronous electric motor of the plurality of the permanent magnet synchronous electric motors,
the rotor rotation speeds of the permanent magnet synchronous electric motors,
the winding wire currents of the permanent magnet synchronous electric motors, and
the winding wire inductances of the permanent magnet synchronous electric motors,
to thereby calculate the difference of the interlinkage magnetic fluxes of the permanent magnet synchronous electric motors.

9. The anomaly detector of the permanent magnet synchronous electric motor according to claim 1, wherein
the magnet temperature anomaly determiner uses the difference and a ratio between the q-axis voltage command value which is calculated by the one of the q-axis voltage command value calculators and is relative to the one permanent magnet synchronous electric motor of the plurality of the permanent magnet synchronous electric motors and the q-axis voltage command value which is calculated by the other of the q-axis voltage command value calculators and is relative to the other permanent magnet synchronous electric motor of the plurality of the permanent magnet synchronous electric motors, to thereby determine whether or not the anomaly of the magnet temperature is caused to at least any one of the permanent magnet synchronous electric motors.

10. The anomaly detector of the permanent magnet synchronous electric motor according to claim 9, wherein
when all of the q-axis voltage command values relative to the plurality of the permanent magnet synchronous electric motors are more than or equal to a predetermined lower limit set in advance, the magnet temperature anomaly determiner uses the ratio between the q-axis voltage command value which is calculated by the one of the q-axis voltage command value calculators and is relative to the one permanent magnet synchronous electric motor of the plurality of the permanent magnet synchronous electric motors and the q-axis voltage command value which is calculated by the other of the q-axis voltage command value calculators and is relative to the other permanent magnet synchronous electric motor of the plurality of the permanent magnet synchronous electric motors, to thereby determine whether or not the anomaly of the magnet temperature is caused to at least any one of the permanent magnet synchronous electric motors, and
when at least any one of the q-axis voltage command values relative to the plurality of the permanent magnet synchronous electric motors is less than the predetermined lower limit, the magnet temperature anomaly determiner uses the difference between the q-axis voltage command value which is calculated by the one of the q-axis voltage command value calculators and is relative to the one permanent magnet synchronous electric motor of the plurality of the permanent magnet synchronous electric motors and the q-axis voltage command value which is calculated by the other of the q-axis voltage command value calculators and is relative to the other permanent magnet synchronous electric motor of the plurality of the permanent magnet synchronous electric motors, to thereby determine whether or not the anomaly of the magnet temperature is caused to at least any one of the permanent magnet synchronous electric motors.

11. The anomaly detector of the permanent magnet synchronous electric motor according to claim 9, wherein
at a timing at which winding wire currents of the plurality of the permanent magnet synchronous electric motors are each zero, the magnet temperature anomaly determiner implements the determining of the anomaly of the magnet temperature by using the ratio of the q-axis voltage command values.

12. The anomaly detector of the permanent magnet synchronous electric motor according to claim 11, wherein
the current command value calculator calculates the current command values relative to the plurality of the permanent magnet synchronous electric motors such that a time average of a torque outputted by the plurality of the permanent magnet synchronous electric motors is allowed to follow a torque command value while the timing at which the winding wire currents of the plurality of the permanent magnet synchronous electric motors are each zero is formed.

13. The anomaly detector of the permanent magnet synchronous electric motor according to claim 9, further comprising:
an interlinkage magnetic flux calculator for calculating a value of an interlinkage magnetic flux of each of the permanent magnet synchronous electric motors based on the difference and ratio of the q-axis voltage command values which are calculated by the q-axis voltage command value calculators and are relative to the plurality of the permanent magnet synchronous electric motors,
wherein
based on torque command values relative to the plurality of the permanent magnet synchronous electric motors and on the values of the interlinkage magnetic fluxes of the plurality of the permanent magnet synchronous electric motors, the current command value calculator calculates the current command values relative to the plurality of the permanent magnet synchronous electric motors.

14. A method of detecting an anomaly of a permanent magnet synchronous electric motor, comprising:
calculating current command values relative to a plurality of permanent magnet synchronous electric motors;
calculating each of q-axis voltage command values relative to the plurality of the permanent magnet synchronous electric motors based on the current command values each calculated by the current command value calculating operation; and
determining whether or not an anomaly of a magnet temperature is caused to at least any one of the permanent magnet synchronous electric motors, the determining operation being implemented by using a difference between:
a q-axis voltage command value which is calculated by one of the q-axis voltage command value calculating operations and is relative to one permanent magnet synchronous electric motor of the plurality of the permanent magnet synchronous electric motors, and
a q-axis voltage command value which is calculated by another of the q-axis voltage command value calculating operations and is relative to another permanent magnet synchronous electric motor of the plurality of the permanent magnet synchronous electric motors.

15. An anomaly detector of a permanent magnet synchronous electric motor, comprising:
a plurality of permanent magnet synchronous electric motoring means;
a current command value calculating means for calculating current command values relative to the plurality of the permanent magnet synchronous electric motoring means;
q-axis voltage command value calculating means for calculating each of q-axis voltage command values relative to the plurality of the permanent magnet synchronous electric motoring means based on the current command values each calculated by the current command value calculating means; and
a magnet temperature anomaly determining means for determining whether or not an anomaly of a magnet temperature is caused to at least any one of the permanent magnet synchronous electric motoring means, the determining operation being implemented by using a difference between:
a q-axis voltage command value which is calculated by one of the q-axis voltage command value calculating means and is relative to one permanent magnet synchronous electric motoring means of the plurality of the permanent magnet synchronous electric motoring means, and
a q-axis voltage command value which is calculated by another of the q-axis voltage command value calculating means and is relative to another permanent magnet synchronous electric motoring means of the plurality of the permanent magnet synchronous electric motoring means.

* * * * *